United States Patent [19]
Kawase et al.

[11] Patent Number: 5,767,858
[45] Date of Patent: Jun. 16, 1998

[54] COMPUTER GRAPHICS SYSTEM WITH TEXTURE MAPPING

[75] Inventors: Kei Kawase, Sagamihara; Nobuyoshi Tanaka, Yamato, both of Japan

[73] Assignee: International Business Machines Corporation, Armonk, N.Y.

[21] Appl. No.: 566,244

[22] Filed: Dec. 1, 1995

[30] Foreign Application Priority Data

Dec. 1, 1994 [JP] Japan .................................. 6-298618

[51] Int. Cl.$^6$ .................................................. G09B 9/08
[52] U.S. Cl. .................................................. 345/430
[58] Field of Search .................................. 395/125, 126, 395/128, 129, 130, 131, 132

[56] References Cited

U.S. PATENT DOCUMENTS 5,490,240   2/1996   Foran et al. ......................... 395/130
5,537,224   7/1996   Suzuoki et al. ..................... 395/130 X
5,553,208   9/1996   Murata et al. ...................... 395/130 X Primary Examiner—Phu K. Nguyen
Assistant Examiner—Cliff N. Vo
Attorney, Agent, or Firm—Martin J. McKinley

[57] ABSTRACT

Provided are a plurality of texture memory clusters for storing interleaved texture image data composed of a plurality of texels in each memory so as to avoid duplication, each having a collecting circuit for computing, from the coordinates of a texture image for one pixel, texels for calculating a texture value corresponding to the coordinates, and for collecting the texel values from the plurality of texture memory clusters, and circuitry for calculating the texture value for the above one pixel from the collected texel values, a bus for interconnecting the plurality of memory clusters, and a plurality of texture generators each connected to one of the plurality of memory clusters for calculating the coordinates of the texture image for the above one pixel. Texel values can efficiently exchanged between each memory cluster without redundantly holding texels in memories.

9 Claims, 8 Drawing Sheets

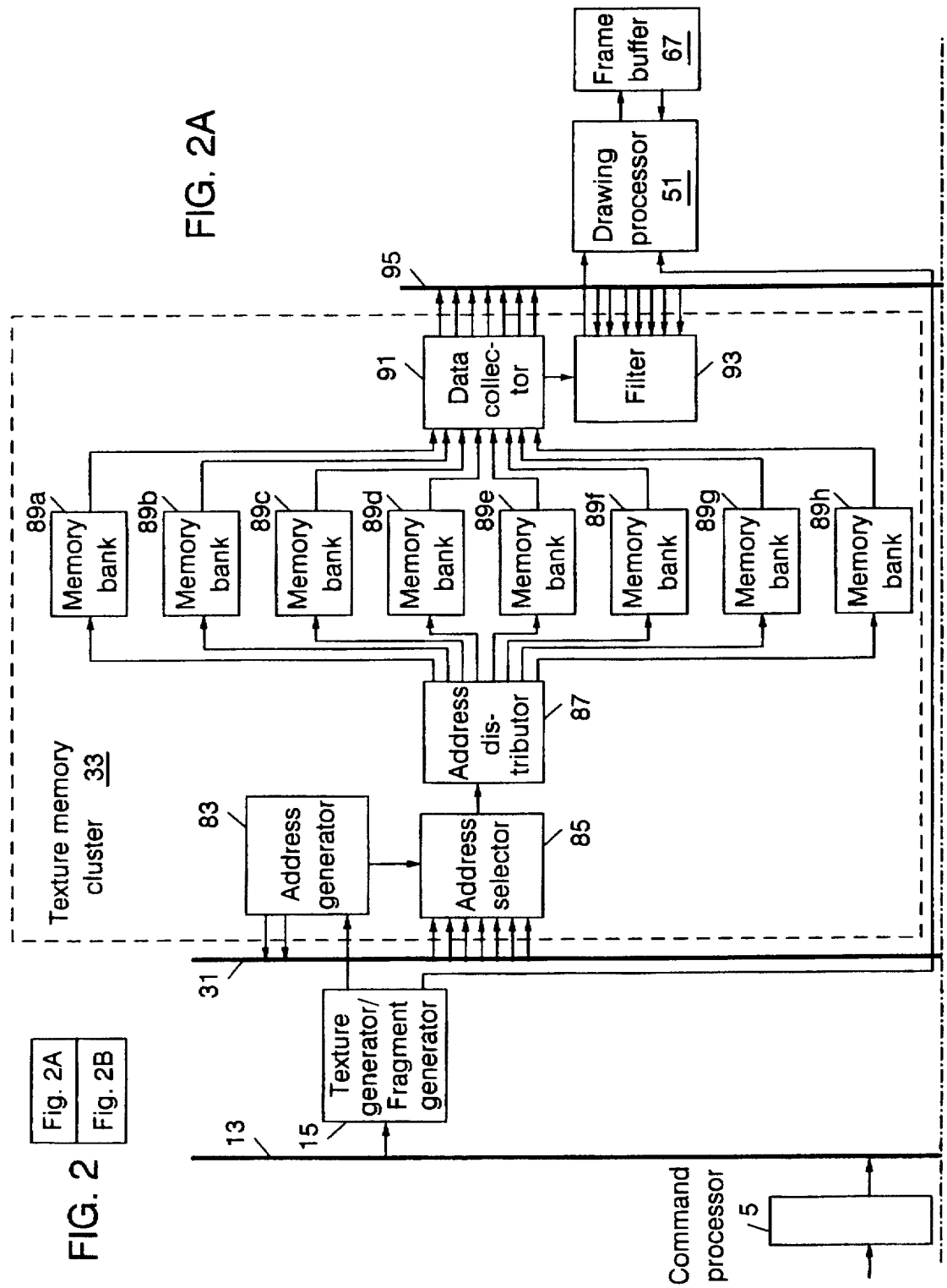

FIG. 3A

LOD0

| j | | | | | | | | |
|---|---|---|---|---|---|---|---|---|
| 7 | 2 | 3 | 2 | 3 | 2 | 3 | 2 | 3 |
| 6 | 0 | 1 | 0 | 1 | 0 | 1 | 0 | 1 |
| 5 | 2 | 3 | 2 | 3 | 2 | 3 | 2 | 3 |
| 4 | 0 | 1 | 0 | 1 | 0 | 1 | 0 | 1 |
| 3 | 2 | 3 | 2 | 3 | 2 | 3 | 2 | 3 |
| 2 | 0 | 1 | 0 | 1 | 0 | 1 | 0 | 1 |
| 1 | 2 | 3 | 2 | 3 | 2 | 3 | 2 | 3 |
| 0 | 0 | 1 | 0 | 1 | 0 | 1 | 0 | 1 |
| | 0 | 1 | 2 | 3 | 4 | 5 | 6 | 7 i |

FIG. 3B

LOD1

| j | | | | |
|---|---|---|---|---|
| 3 | 6 | 7 | 6 | 7 |
| 2 | 4 | 5 | 4 | 5 |
| 1 | 6 | 7 | 6 | 7 |
| 0 | 4 | 5 | 4 | 5 |
| | 0 | 1 | 2 | 3 i |

FIG. 3C

LOD2

| j | | |
|---|---|---|
| 1 | 2 | 3 |
| 0 | 0 | 1 |
| | 0 | 1 i |

FIG. 5A
PRIOR ART
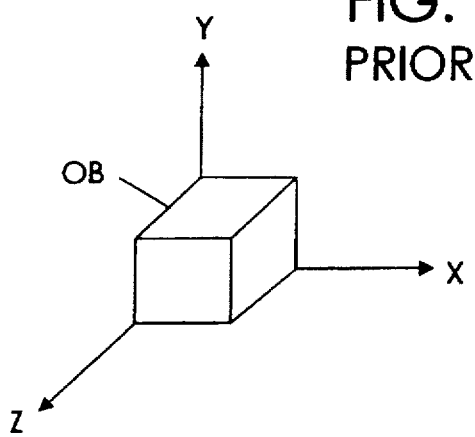
FIG. 5B
PRIOR ART
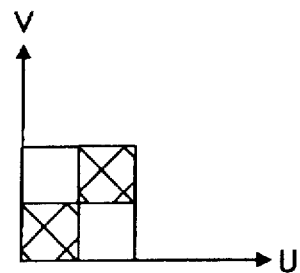
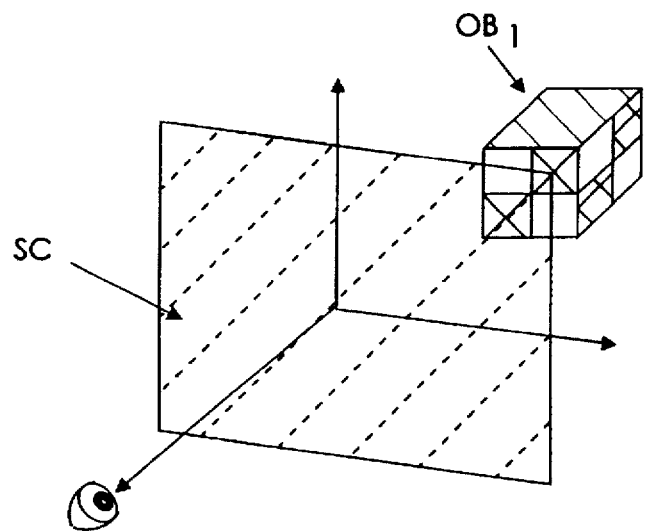
FIG. 5C
PRIOR ART
FIG. 5D
PRIOR ART
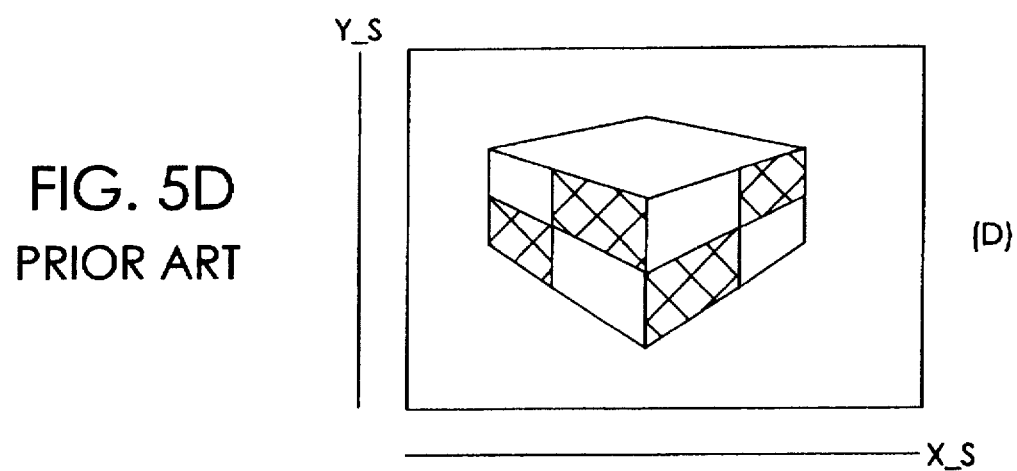

1

COMPUTER GRAPHICS SYSTEM WITH TEXTURE MAPPING

BACKGROUND OF THE INVENTION

Applicants claim the foreign priority benefits under 35 U.S.C. 119 of Japanese Application No. 6-298618 filed Dec. 1, 1994. This Japanese Application and its translation are incorporated into this Application by reference.

The present invention is related to a computer graphics system and, more particularly, to a computer graphics system using a texture mapping in which a computer is used to map a pattern or the like onto a predetermined region.

In computer graphics, a picture may be formed by a texture mapping in which various patterns or images (textures) are mapped. The texture mapping means that a pattern or image (texture) having no thickness, such as grain of wood or a striped pattern on the surface of a watermelon, is spread on a smooth plane or curved surface (hereinafter referred to as mapping). For instance, Flight Simulator (a trademark of Microsoft Corp., U.S.A.) provides an image of virtual reality at high speed by a texture mapping of a picture image of a previously photographed scene on a background portion.

However, since the texture mapping requires the accessing of a large amount of data and a large amount of calculation, a texture memory having a wide bandwidth and dedicated hardware are needed for a real time processing. The texture memory is a memory for storing two-dimensional array data representing an image such as a pattern to be mapped or a background (hereinafter referred to as texture image data). This texture memory is costly because it requires a large capacity as well as high-speed accessing.

With the recent acceleration of providing a large capacity to computers as well as the downsizing and speed-up of them, to provide a hardware capable of performing a high-speed and high-efficiency texture mapping at a low cost is demand and a problem in computer systems utilizing computer graphics. The texture mapping is described below in detail.

The coordinate system in texture mapping will now be described. In computer graphics, the following three types of coordinate systems are generally used to express an object.

The first coordinate system is a model coordinate system. The model coordinate system is a coordinate system unique to an individual object, that is, a coordinate system which is appropriately selected to describe an object. In FIG. 5 (A), a cube OB is shown by way of example as an object in a rectangular coordinate system in which an X-axis, Y-axis and Z-axis are orthogonal with each other.

The second coordinate system is an eye coordinate system. The eye coordinate system is a coordinate system coincident with the position of an eye when an object is effectively viewed, that is, a coordinate system in which the line of sight coincides with one coordinate axis, as shown in FIG. 5 (C).

The third coordinate system is a screen coordinate system. The screen coordinate system is a coordinate system in a two-dimensional screen SC (refer to FIG. 5 (C)) on which a three-dimensional scene including an object is projected as shown in FIG. 5 (D). The screen coordinate system in FIG. 5 (C) consists of an X_S axis, abscissa, and a Y_A axis, ordinate, which are orthogonal with each other.

In the texture mapping, in addition to the above three types of coordinate systems, a coordinate system for describing texture image data (hereinafter referred to as texture coordinate system) is required, as shown in FIG. 5 (B). The texture coordinate system in FIG. 5 (B) consists of a U-axis, abscissa, and a V-axis, ordinate, which are orthogonal with each other. The effective action of the texture mapping is to draw the color of texture image data specified by texture coordinates at a point where the original color of an object is to be drawn in the screen coordinate system.

The above model coordinate system is a coordinate system to simply describe each primitive object for convenience when a complex object comprising, in combination, a plurality of primitive objects. Accordingly, to perform a texture mapping on a complex object and describe it by the screen coordinate system, the complex object in which the plurality of primitive objects are collected is converted to the eye coordinate system. Here, description is made to the case in which a shading is given to the upper surface of the cube OB and a texture mapping is performed on the sides of it (refer to the cube OB1 of FIG. 5 (C)). It is assumed that, thereafter, the plurality of described primitive objects are projected on the screen SC. At this point, the complex object (cube OB1) is described in the screen coordinate system. To simplify the following description, it is assumed that the object to be treated has already been converted to the screen coordinate system.

The details of texture mapping will now be described. As shown in FIG. 6 (A), in texture image data, unit squares (squares the length of one side of which is one) are arranged lengthwise and crosswise to form a square of a predetermined size (in FIG. 6 (A), a square region formed by 8×8 unit squares). In the center of the respective unit squares around a lattice point, that is, a lattice point (in the figure, marked by X) corresponding to the j-th row (j: $0 \leq j \leq 7$) in the i-th column (i: $0 \leq i \leq 7$), the color information of an image to be mapped is stored.

Hereinafter, the respective unit square is referred to as a texel, the center of the unit square is referred to as a texel center, the color information stored in the texel center is referred to as a texel value, and the square region of a predetermine size in which the texels are arranged is referred to as a texture. Further, the number of texels contained in one side of a texture (in FIG. 6 (A), eight) is called the size of the texture. To simplify the following description, the texel value of a texel (i, j) at the j-th row and the i-th column is abbreviated as T [i, j].

In the mapping of a texture on a curved surface, an ordinary curved surface is divided into polygons, and in the eye coordinate system, the texture mapping means a linear transformation between polygon and texture. By this, each point on a polygon corresponds to each point on a texture strictly in a one-to-one relationship, and this correspondence can be determined when the texture is mapped on the polygon. Finally, the color of each pixel in the polygon projected on a screen must be determined. Accordingly, in the screen coordinate system, each pixel in the eye coordinate system must corresponds to each texel in a texture, but the screen coordinate system is a projection of the eye coordinate system on the screen SC, so that the coordinates of a point P (u, v) in the texture corresponding to a pixel (x_s, y_s) are predetermined. This correspondence is used to determine the color of the pixel (x_s, y_s). The generally used algorithms to determine color are roughly classified into a method in which original texture image data and data obtained by further processing the original data (called mipmap), and a method in which original texture image data on the like is used without using mipmap.

The method which does not use mipmap is divided into two methods, one of which is a method in which the texel value of a texel containing a point P is made to be the color of a pixel. That is, the texel value T [$i_0$, $j_0$] of a texel ($i_0$, $j_0$) in a texture nearest to the point P is made to be the color of the pixel. The arguments $i_0$ and $J_0$ can be determined as the integral parts of u+0.5, and v+0.5, respectively. This is a method called Texel Nearest in OpenGL (Mar Segal, Akeley, The OpenGL Graphics System: A specification Version 1.0), a type of API (Application Program Interface) for a three-dimensional graphics interface.

However, if a polygon on which a texture mapping is performed exists near and it is greatly magnified on the screen coordinate system, one texel value corresponds to a large number of pixels, causing jags as in the tiling.

The other method is the second Texel Linear Interpolated, an improvement of the above described one (sometimes abbreviated as Texel Linear, and hereinafter referred to as Texel Linear). In this case, as shown in FIG. 6 (A), the values of the four texels surrounding the point P are linearly interpolated. That is, when it is assumed that the texel centers surrounding the point P (u, v) are ($i_0$, $j_0$), ($i_0$+1, $j_0$), ($i_0$, $j_0$+1), and ($i_0$+1, $j_0$+1) (bold mark X in the figure), and that a=the fractional part of u and b=the fractional part of v, the value obtained by the following expression is made to be the color of the pixel.

(1−a)×(1−b)×T[$i_0$, $j_0$]+(1−a)×b×T[$i_0$, $j_0$+1]+a×(1−b)×T[$i_0$+1, $j_0$]+a×b×T[$i_0$+1, $j_0$+1]

The arguments $i_0$ and $i_0$ can be determined as the integral parts of u and v. The other method is also called Bilinear because it is equivalent to the case in which a linear interpolation is consecutively performed twice, as seen from the above expression.

The mipmap method will now be described. In the above method, since the minification/magnification ratio of the texel at each point on a projected polygon largely varies depending on the pixel position, inconvenience occurs when a polygon having a large angle formed with the screen is projected. That is, for texels extremely minified on the screen, the weighted mean of four texels as described above is insufficient and many texels are necessary. The necessary texels can be determined from the level of detail between pixel and texel (which can be calculated from the correspondence relationship between pixel and texel and always occurs in calculating a linear interpolation, hereinafter referred to as LOD). The method in which the way of averaging is changed for each pixel (the method referred to as convolution) as described above is not efficient and hard to implement though it is effective, and thus it is usually substituted for by the mipmap to be described below.

In the mipmap, first, of the texels in the original texture, the respective two vertical and horizontal texels surrounded by a bold line in FIG. 6 (A) are collected into a block. Then, the texel value of the block is obtained by averaging the texel values of the four texels contained in the block. Subsequently, as shown in FIG. 6 (B), one new texel is generated so as to correspond to the obtained texel value and disposed in the order of the block in the original texture, and this process is performed for the all blocks to generate a new texture. To distinguish the new texture generated by collecting texels into blocks and the original texture before the generation, the original texture (FIG. 6 (A)) is referred to as a mipmap of level 0, and the new texture reduced to half in size (FIG. 6 (B)) is referred to as a mipmap of level 1. Then, the mipmap of level 1 is similarly handled to generate a mipmap of level 2. A process similar to the above is repeated until the generated texture becomes a texture having a size of one, thereby to generate a mipmap of a higher level. Incidentally, the texel value in such process naturally depends on the level of a mipmap. To express this, by extending the above symbol, the texel value of a texel (i, j) in a mipmap of level k is expressed by T [i, j:k].

Prior to a texture mapping using such mipmap, the level of the mipmap to be used must be determined from the above LOD. Although there is a detailed rule in OpenGL, it is simplified here to necessary parts for explaining. As in the above described Texel Nearest and Texel Linear, there are concepts of Mipmap Nearest and Mipmap Linear, and there are a total of four texel mipmap methods. However, it should be noted that the coordinates P (u, v) of a point corresponding to a pixel in the mipmap of each level becomes P ($U_k$, $V_k$) which depends on level k. Now, each of the four texel mipmap methods 1 to 4 will be described.

1. Nearest-Mipmap-Nearest

Assuming that k=(the integral part of LOD+0.5), a point $P_k$ (u, v) corresponding to a pixel in a mipmap of level k is determined, and a texel value T [$i_0$, $j_0$:k] containing the point $P_k$ is made to be the color of the pixel.

2. Liner-Mipmap-Nearest

Assuming that k=(the integral part of LOD+0.5), a point $P_k$ ($u_k$, $V_k$) corresponding to a pixel in a mipmap of level k is determined, and the texel values of the four texels surrounding the point $P_k$ are linearly interpolated. This is the same as the above described Texel Linear except for the "level k".

3. Nearest-Mipmap-Linear

Assuming that k=(the integral part of LOD), the texel values of the texels respectively containing points $P_k$ and $P_{k+1}$ corresponding to pixels in the respective mipmaps of level k and level k+1 are linearly interpolated with d=(the fractional part of LOD) being an internal

4. Linear-Mipmap-Linear

It is assumed that k=(the integral part of LOD). The (Texel Linear) result of the linear interpolation of the texel values of the four texels containing a point $P_k$ corresponding to a pixel in a mipmap of level k and the (Texel Linear) result of the linear interpolation of the texel values of the four texels containing a point $P_{k+1}$ corresponding to a pixel in a mipmap of level k+1 are linearly interpolated (Mipmap Linear), with d=(the fractional part of LOD) being an internal ratio.

For the computer graphics system for performing a fast texture mapping using the mipmap method as described above, the following points are required.

The texture memory has a large capacity.

The access speed of the memory used as the texture memory is high.

The texture memory is efficiently used.

Regarding the capacity, the texture memory needs a capacity several megabytes since it stores texture image data of textures. Thus as the texture memory, a DRAM is generally used because of its low cost. Further, regarding the speed, since the cycle time of the DRAM is above 80 ns, it can be operated at about 12.5M texels/sec. However, as described above, eight texel values must be looked up at the same time in the Linear-Mipmap-Linear method. To look up eight texel values at the same time, a construction should be provided in which interleaving is performed for each level of mipmap, and each level is interleaved for i and j and stored in eight memories to enable the texel values necessary for Linear-Mipmap-Linear to be simultaneously referred to. Otherwise, the access speed of the order of 100M texels/sec. cannot be achieved.

In addition, the circuit for calculating linear interpolations (interpolator) should be directly connected to the eight memory chips. The bit widths of the address bus for each memory chip and of the data bus from each memory chip to the interpolator are (20+16)×8=288 bits, on the assumption that the address is 20 bits and the texture image data is 16 bits, and thus the wiring becomes complicated and a pin neck problem of chip (restriction on signal lines which can be extracted from one chip) also occurs.

A prior art example will ow be described. As an example satisfying the above requirement, there is a texture mapping processing method corresponding to the computer graphics system (refer to the Unexamined Patent Application Ser. No. 62-140181 official gazette). In this texture mapping processing system, texture image data is divided and held in processor elements, and the texture image data in other processor elements are received through an inter-processor communication path.

However, such computer graphics system has the following problems.

Since it is basically a mechanism for performing a process by software, the operation is complicated and it is difficult to implement by hardware, and thus a high-speed operation cannot be expected.

Since the portion for processing the drawing corresponds to the portion for processing the texture in a one-to-one relationship, the respective ratios cannot be changed. Thus, for the performance requirement for the type and size of a drawing primitive, and for the size of the texture image to be mapped on it, the amount of the portion for processing the texture cannot be changed.

Since it uses a protocol in which information on the pixels to be displayed is sent to other processor elements through an inter-processor communication path and the calculation result based on the sent information is received, the overhead of the protocol is large. In addition, since texels cannot be held so as to completely avoid duplicate if the method using mipmap is attempted to be directly applied, the capacity of the memory in each processor must be large. As a further example of the computer graphics system, there is Reality Engine Graphics (refer to Reality Engine Graphics, COMPUTER GRAPHICS proceedings, Annual Conference Series, 1993pp-116).

As shown in FIG. 7, such computer graphics system 90 includes a processor 12. The command processor 12 is connected to fragment generators 72, 74, 76 and 78 through a command bus 16.

One output of the fragment generator 72 is connected to a drawing processor 42 through a texture memory cluster 22 as a texture memory, and other output thereof is directly connected to the drawing processor 42. The drawing processor 42 is connected to a frame buffer 52. The output of the frame buffer 52 is connected to a display 60. The texture memory cluster 22 consists of an address generator 62, memories (memory banks) 64A, 64B, 64C, 64D, 64E, 64F, 64G and 64H, and a filter 66. The address generator 62 is connected to each memory 64A to 64H, and each memory 64A to 64H is connected to the filter 66.

Further, one output of the fragment generator 74 is connected through a texture memory cluster 24 to a drawing processor 44 which is connected to a frame buffer 54, and the other output is directly connected to the drawing processor 44. Similarly, one output of the fragment generator 76 is connected through a texture memory cluster 26 to a drawing processor 46 which is connected to a frame buffer 56, and the other output is directly connected to the drawing processor 46. One output of the fragment generator 78 is connected through a texture memory cluster 28 to a drawing processor 48 which is connected to a frame buffer 58, and the other output is directly connected to the drawing processor 48. In addition, the outputs of the frame buffers 54, 56 and 58 are connected to the display 60.

Since the texture memory clusters 24, 26 and 28 has the same construction as the texture memory cluster 22, the detailed description of them is omitted.

In addition, in the computer graphics system 90, the screen is vertically divided into four columns, and the pixels belonging to the respective divided columns are handled and processed by the texture memory clusters 22, 24, 26 and 28, respectively.

The operation of the computer graphics system 90 is now described. First, the command processor 12 interprets the instructions to the fragment generators 72 to 78, the texture memory clusters 22 to 28, and the respective drawing processors 42 to 48, which are all provided downstream of the command processor 12, and outputs the instructions and the like to the command bus 16. The instructions include a control command for storing data in the register, not shown, in each processor 42 to 48, and a drawing command. The drawing on the screen is performed on a triangle (polygon) basis. When the command processor 12 receives the drawing command, it receives the subsequent data based on a vertex of a triangle (the coordinates of a vertex of a triangle or the like). The format of this data is shown in FIG. 8, where $x\_s$, $y\_s$: the coordinates of the vertex of a triangle in the screen coordinate system, R, G, B, A: color information at the coordinates ($x\_s$, $y\_s$) on the screen SC, u, v: the coordinates in the texture coordinate system of texture image data to be subjected to a texture mapping on the coordinates ($x\_s$, $y\_s$).

These data are simultaneously broadcast to each of the fragment generators 72, 74, 76 and 78 through the command bus 16. Each fragment generator interpolates the obtained data to generate data for each pixel in the triangle. If it is data to be treated by the fragment generator itself, the data interpolated on a pixel basis (shown in FIG. 9) is output to the corresponding drawing processors 42 to 48.

Along with these, the fragment generator outputs the data shown in FIG. 10, namely, the coordinates of a vertex of a triangle in the screen coordinate system, and the coordinates (u, v) in the texture coordinate system of the texture image data to be subjected to a texture mapping on the coordinates ($x\_s$, $y\_s$) to the corresponding memory cluster.

If, at this point, the pixel is not the one which the fragment generator itself handles, the data is discarded in the drawing processor, but a pixel which is not processed at all does not occur since the pixel is always treated by any of the fragment generators. The address generator of a texture memory cluster determines a texel necessary for the above described calculation, for instance, Linear-Mipmap-Linear, on the basis of the coordinates (u, v), and calculates and outputs the physical address of the texel in the memory. Based on the physical address, the memory outputs a texel value to the filter, which performs a calculation necessary for Linear-Mipmap-Linear for example on the basis of the output texel value, and outputs the color information from the texture memory cluster which is to be mapped on the pixel to the corresponding drawing processor. The drawing processor takes into consideration the previously input color information of the pixel and the color information from the texture memory cluster, and reflect them on the value of the particular pixel stored in the frame buffer.

In the respective texture memory clusters 22 to 28, texture image data of the completely same content is repeatedly prestored. Accordingly, by the parallel effect by the four texture memory clusters 22 to 28, the increase of performance, particularly the speed-up of the processing can be achieved, but the capacity of the expensive memory increases if data is repeatedly held.

In view of the above fact, it is the object of the present invention to provide a computer graphics system which can efficiently operate the texture mapping function in the computer graphics interface.

In particular, it is the object to provide a system in which the degradation of efficiency remains in a tolerance if the necessary memory capacity is drastically reduced.

SUMMARY OF THE INVENTION

The present invention accomplishing the above object is a computer system for performing a texture mapping comprising: a plurality of texture memory clusters for storing interleaved texture image data composed of a plurality of texels in memories of each of said plurality of texture memory clusters so as to avoid duplicate, each said plurality of memory clusters having collecting means for computing, from the coordinates of a texture image for one pixel, texels necessary for calculating a texture value corresponding to the coordinates, means for collecting texel values which are color information of the texels from said plurality of texture memory clusters, and means for calculating the texture value for said one pixel from said collected texel values; a bus for interconnecting said plurality of texture memory clusters; a plurality of texture generating means, each connected to one of said plurality of texture memory clusters, for calculating the coordinates of the texture image for said one pixel; and a plurality of drawing processors, each connected to one of said plurality of texture memory clusters, for generating data to be displayed on said one pixel by using the texture value for said one pixel. By this, texels values can be efficiently exchanged between each texture memory cluster without holding duplicate texels in each texture memory cluster.

Further, the above collecting means may comprises means for computing, from the coordinates of a texture image for one pixel, texels necessary for calculating a texture value corresponding to the coordinates, and notifying them to the plurality of memory clusters; retrieval means for retrieving the memory to obtain the texel values of the notified texels; means for sending the texel values to the texture memory clusters notified of the texels; and means for receiving the texel values.

Furthermore, the above memory may be divided into a plurality of banks, which interleaves and stores the texture image data stored in the texture memory clusters so as to avoid duplicate. This can completely exclude the duplicated holding of the same texel value in the memories in the texture memory cluster.

Moreover, the above plurality of banks may include an input FIFO buffer and an output FIFO buffer. By this, the degradation of performance due to the concentration of accesses to the same bank can be prevented if a texel is interleaved by its address and stored.

Further, the above retrieval means may comprise means for calculating an address of the notified texel; distribution means for distributing, from the calculated address, the address to a corresponding bank of the memory; and means for obtaining texel values from the bank of the memory. By this distribution, the memory can be efficiently accessed.

Furthermore, each of the texture memory clusters may further comprise a FIFO buffer for storing the IDs of the texture memory clusters notified of the necessary texels. This allows the texel values of the necessary texels to be sent to the necessary texture memory clusters.

Further, each of the texture memory clusters may further comprise a FIFO buffer for storing the ID of the bank of the memory to which the calculated address was distributed. This allows the retrieval result to be output from an appropriate memory bank.

In addition, the above collecting means may comprise: means for notifying the coordinates of the texture image for one pixel to the plurality of texture memory clusters; means for calculating from the coordinates texels necessary for calculating a texture value corresponding to the coordinates, the texels being held by the memory of itself; means for fetching the texel values of the texels from the memory; means for sending the texel values to the texture memory clusters notified of the texels; and means for receiving the texel values.

As another aspect of the present invention, there is a computer system for performing a texture mapping comprising: a plurality of texture memory clusters for storing interleaved texture image data in each memory so as to avoid duplicate, the texture image data containing a texture image composed of a plurality of texels, and a reduced texture image which is data obtained by reducing the texture image in one or more grades and which is comprised of one or more texels, each plurality of texture memory clusters having means for computing, from the coordinates of the texture image for one pixel and the reduction ratio between the pixel and the texel of the texture image, texels necessary for calculating a texture value for the above described one pixel, and for requesting that the plurality of texture memory clusters output texel values which are the color information of the texels, means for retrieving and outputting the requested texel values to the requested texture memory clusters, means for collecting the values of the texels, and means for calculating the texture value from the collected texel values; a bus for interconnecting the plurality of texture memory clusters; a plurality of texture generating means, each connected to one of the plurality of texture memory clusters, for calculating the coordinates of the texture image for the above described one pixel and the reduction ratio; and a plurality of drawing processors, each connected to one of the plurality of texture memory clusters, for generating data to be displayed on the above one pixel by using the texture value for the above one pixel. By this, the memories of the texture memory clusters can effectively utilized in such a texture mapping using mipmap.

The operation will now be summarized. In the construction of the present invention described first, each texture generator generates the coordinates of the texture image for one pixel (rasterization), and sends them to the respective connected texture memory clusters. Then, in each texture memory cluster, the collecting means calculates necessary texels of the texture image data from the coordinates of the texture image. Then, from the texture memory clusters including itself having the texels, the texel values of the texels are collected. When the necessary texels can be collected, the texture value for the above one pixel is calculated. The calculated texture value is used in the drawing processor connected to the texture memory cluster in which the calculation was performed, thereby for calculating the data to be displayed on that one pixel. Then, the data to be displayed is input to the frame buffer.

If the above collecting means is divided into the notifying means, the retrieval means, the sending means, and the receiving means, the notifying means notifies the necessary texels to the plurality of texture memory clusters including itself. Then, the retrieval means retrieves the memory to see whether it has a texel, and if it has, the retrieval means outputs the texel value of the texel. If there is any output, it is sent by the sending means to the requesting side, and the receiving means of the requesting texture memory cluster receives the texel value.

As described above, the memory is divided into a plurality of banks, and if the texture image is also interleaved in each bank, it is needed to record whether the target texel is stored in each bank and extract data from the bank.

If each memory has an input FIFO and an output FIFO as described above, then even if the necessary texel values are stored in the same memory bank, the degradation of the total performance can be prevented by temporarily storing the necessary texel values in the FIFO if there are accesses to the same memory bank.

Further, if the above retrieval means includes an address calculation means, a distribution means, and a means for obtaining a texel value, the address calculation means calculates the address in the memory of the notified texel, and the distribution means distributes the address to the corresponding memory bank according to the address. Then, the target texel value can be obtained from the memory bank.

Moreover, if there is provided a FIFO buffer for storing the ID of the texture memory cluster to which the necessary texel is sent, the requesting texture memory cluster may be input to the FIFO when the request for the texel is received, and the outputs from the memory bank storing the target texel value may be sent in the order of the storage contents of the FIFO (in the receipt order of the request).

If there is provided a FIFO buffer for storing the ID of the memory bank to which the calculated address is distributed, the ID of the memory bank to which the address is distributed is stored in the FIFO when the address is distributed, the correspondence between the bank output and the texture memory cluster to be provided with the bank output is given along with the FIFO of the above texture memory cluster.

In another aspect of the collecting means, the coordinates of a texture image are sent to the plurality of texture memory clusters including itself without being changed, and in the receiving texture memory clusters, the texel requiring a calculation means and held is calculated. The texel value of this texel is extracted and sent to the requesting (sending) texture memory cluster. That texture memory cluster receives the sent texel value, and calculates the texture value in the filter.

In addition, in a further aspect of the present invention, the coordinates of a texture image for one pixel and the minification/magnification ratio between pixel and texel are calculated and sent to the connected texture memory cluster. Then, the value of the requested texel is retrieved and sent to the requesting texture memory cluster. Then, the necessary texel values are collected to calculate the texture value. The calculated texture value is used by the drawing processor connected to the particular texture memory cluster for calculating the data to be displayed for the above pixel. The data to be displayed is input to the frame buffer and displayed on the display device.

BRIEF DESCRIPTION OF THE DRAWINGS

FIG. 3 is a conceptual view showing the method for storing the texels to be stored in the texture memory cluster;

FIG. 5 is a diagram showing the coordinate systems which are used in computer graphics;

DESCRIPTION OF SYMBOLS

Figure 1:
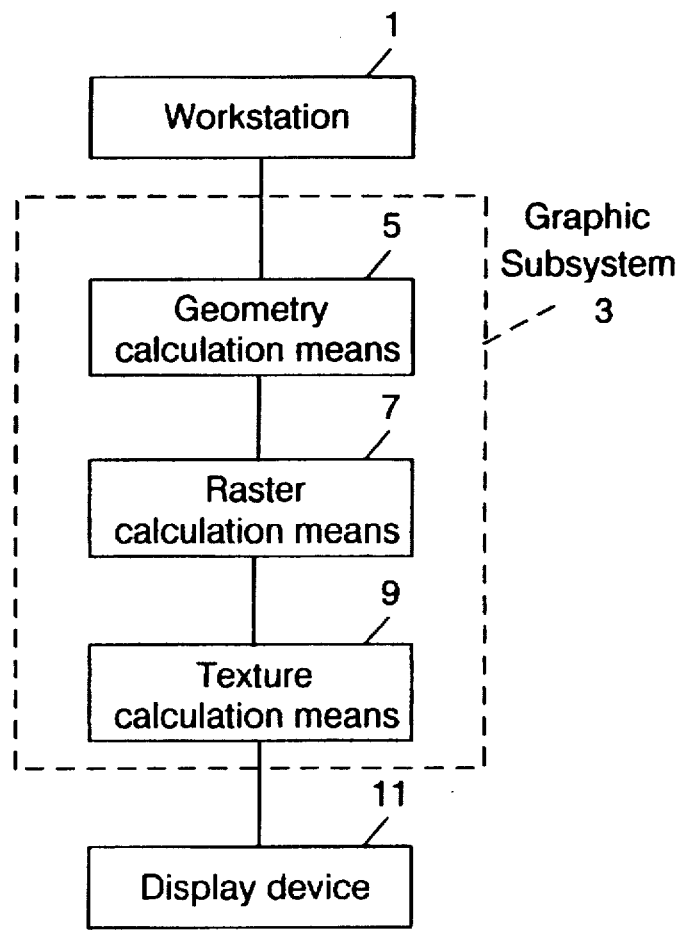
FIG. 1 is a general view of the system to which the present invention is applied.
Figure 8:
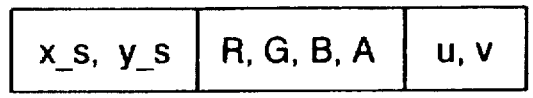
FIG. 8 is a block diagram showing the data format of a prior art example.
Figure 9:
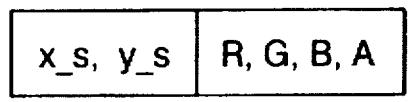
FIG. 9 is a block diagram showing the data format of a prior art example.
Figure 10:
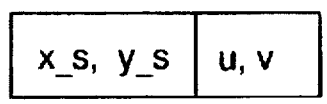
FIG. 10 is a block diagram showing the data format of a prior art example.

1 . . . Workstation
3 . . . Graphic subsystem
5 . . . Geometry calculation means
7 . . . Raster calculation means
9 . . . Texture calculation means
11 . . . Display device
13 . . . Bus
15 . . . to 29 Texture generators/fragment generators
31 . . . Address distribution bus
33 . . . to 47 Texture memory clusters
51 . . . to 65 Drawing processors
67 . . . to 81 Frame buffers
83 . . . Address generator
85 . . . Address selector
87 . . . Address distributor
89 . . . Memory bank
91 . . . Data collector
93 . . . Filter
95 . . . Data exchange bus
101 . . . Multiplexer
103 . . . Destination FIFO
105 . . . Memory bank
107 . . . Constant FIFO
109 . . . Buffer
111 . . . Buffer
113 . . . Buffer
115 . . . Tag FIFO

DESCRIPTION OF THE ILLUSTRATIVE EMBODIMENTS

In FIG. 1, the whole system used in the present invention is shown. A workstation 1 includes a main CPU, a main memory, input/output devices such as a keyboard and a printer, and storage devices such as a FDD and a HDD. Connected to the bus of the workstation 1 is a graphic subsystem 3, the output of which is displayed on a display device 11. The graphic subsystem 3 consists of a geometry calculation means 5, a raster calculation means 7, and a texture calculation means 9.

The operation of FIG. 1 is described. The CPU of the workstation 1 instructs the graphic subsystem 3 to perform a drawing if it desires to display something on the display device 11. For instance, if the CPU instructs a drawing in which a texture image is mapped on an object at a certain position (eye coordinates), the geometry calculation means 5 performs a polygon division, computes the coordinates on the screen at a vertex of the polygon, and the coordinates of the texture image on these coordinates are calculated. If there is a further specification of color, that color information is also calculated. Using this result, the raster calculation means 7 calculates the coordinates on the screen for each pixel in the polygon and the coordinates of the texture image (also color information if any). From the coordinates of the texture image and the level of detail LOD (also called reduction ratio) of texel, the texture calculation means 9 generates the value of the texture corresponding to that pixel. Then, the value of the texture is used to generate data to be displayed, which is stored in the frame buffer. By the stored data, the above object is drawn on the screen of the display device 11.

Figure 2B:
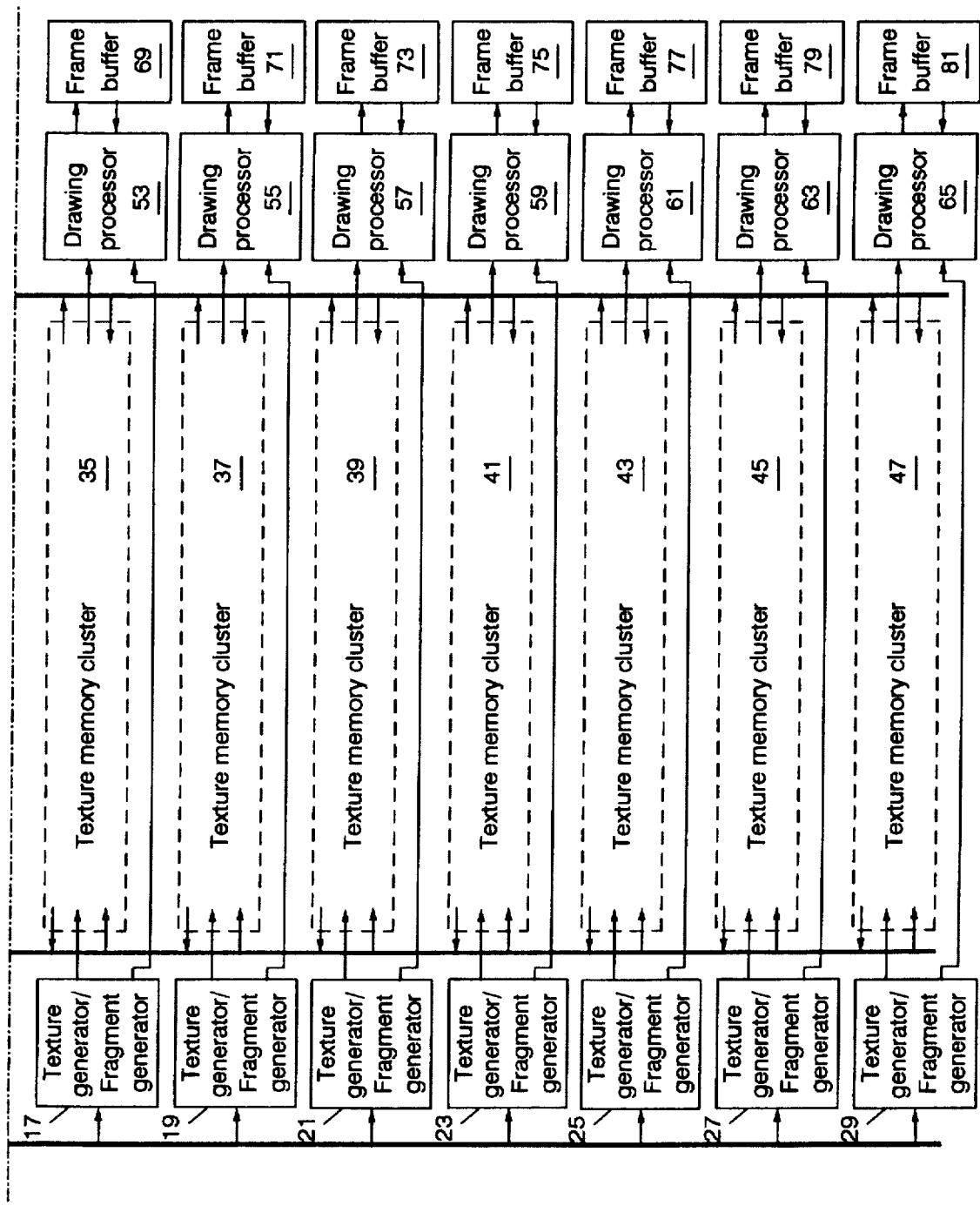
FIG. 2 is a block diagram showing the construction of the main portions of the computer graphics system which is an embodiment to which the present invention can be applied.

The details of the graphic subsystem is shown in FIG. 2. The geometry calculation means 5 is connected via a bus 13 to a plurality of texture generators/fragment generators 15, 17,19,21,23,25,27 and 29 (here, eight). Each texture generator/fragment generator is connected to one texture memory cluster. The texture memory clusters 33, 35, 37, 39, 41, 45 and 47 are interconnected by an address distribution bus 31 and a data exchange bus 95. Each texture memory cluster is connected to drawing processors 51, 53, 55, 57, 59, 61, 63 and 65, respectively. To the drawing processors, the fragment generators are also directly connected. Each drawing processor is connected to frame buffers 67, 69, 71, 73, 75, 77, 79 and 81, respectively.

The schematic of the texture memory cluster is shown only for the texture memory cluster 33. For the remaining texture memory clusters, they have the same content and the description of them is omitted. The output from the texture generator 15 is connected to an address generator 83, and outputs from the address generator 83 are connected to an address distribution bus. The remaining output is connected to an address selector 85. The output of the address selector 85 is connected to an address distributor 87, which is connected to a plurality of memory banks 89 (here, eight). The outputs of the memory banks 89 are connected to a data collector 91. Outputs from the data collector 91 are also connected to the data exchange bus 95 to output data to the other texture memory clusters. The remaining output of the data collector 91 is also connected to a filter 93. In the filter 93, the data collector 91 is connected to the data exchange bus 95 as well as the output from the data collector 91 so as to receive the outputs from the other texture memory clusters. The filter 93 outputs the generated texture value to the drawing processor 51 in charge.

The operation of the devices shown in FIG. 2 is described below. As described above, the geometry calculation means 5 calculates and outputs the coordinates of the pixel related to vertices of each polygon, the coordinates of a texture image, and the color information at the particular point. This output is broadcast by the bus 13, and received at each texture generator/fragment generator. Each texture generator performs an interpolatory calculation of the pixels in a polygon, and calculates the coordinates on the screen and the coordinates of the texture image for each pixel. Further, the fragment generator similarly performs an interpolatory calculation of the pixels in a the polygon, and calculates the coordinates on the screen and the color information for each pixel. In this interpolatory calculation, the level of minification ratio LOD between pixel and texel is also calculated at the same time. However, each texture generator and fragment generator are previously assigned pixels which they are in charge of, and data other than the pixels which they are in charge of is not generated. In addition, the raster calculation means 7 corresponds to the texture generator/ fragment generator in FIG. 2.

Now, how each texture memory cluster holds the texture image is simply described. However, it is to be noted that Linear-Mipmap-Linear described in the prior art section is used in ordinary applications, and description is made to an example which aims maximizing the performance when a texture mapping is performed by this method. In this Linear-Mipmap-Linear, it is required to access eight texel values can be accessed at the same time. Accordingly, the necessary texel values are distributed to and stored in eight texture memory clusters. That is, in the example of FIG. 2, for instance:

- in the texture memory cluster 33 (cluster 0), texels for which the minification ratio LOD is an even number, i is an even number, and j is an even number;
- in the texture memory cluster 35 (cluster 1), texels for which the minification ratio LOD is an even number, i is an odd number, and j is an even number;
- in the texture memory cluster 37 (cluster 2), texels for which the minification ratio LOD is an even number, i is an even number, and j is an odd number;
- in the texture memory cluster 39 (cluster 3), texels for which the minification ratio LOD is an even number, i is an odd number, and j is an odd number;
- in the texture memory cluster 41 (cluster 4), texels for which the minification ratio LOD is an odd number, i is an even number, and j is an even number;
- in the texture memory cluster 43 (cluster 5), texels for which the minification ratio LOD is an odd number, i is an odd number, and j is an even number;
- in the texture memory cluster 45 (cluster 6), texels for which the minification ratio LOD is an odd number, i is an even number, and j is an odd number; and
- in the texture memory cluster 47 (cluster 7), texels for which the minification ratio LOD is an odd number, i is an odd number, and j is an odd number.

An example in which the original texture image is 8×8 is shown in FIG. 3. FIG. 3 (A) shows an texture image whose LOD is 0. The number in each frame represents the number of the texture memory cluster in which the particular texel value is to be stored (the number in the above parenthesis). If the LOD is 0, or an even number, as this, texel values are stored in clusters 0 to 3. Further, if the LOD is 1 (FIG. 3 (B)), they are stored in clusters 4 to 7. It is similar for FIG. 3 (C).

On the assumption that texture images are stored in the respective texture memory clusters, the description of the operation is proceeded with. The texture memory cluster having received the coordinates and minification ratio LOD of a texture image from the texture generator finds out the texels needed by the address generator. That is, it calculates the value of the integral part of the calculated LOD, the value obtained by adding one to that (always even or odd), and the coordinates (i, j) of the texel for each particular level. Then, they are output to the address distribution bus 31, and also to the connected address selector. The output of the address distribution bus 31 is also input to the address selectors of the clusters other than the texture memory clusters which output them. For instance, since four texel values are referred to for the mipmap of one LOD, with the coordinates of the texel calculated by the address generator being at the lower-left, each address selector recognizes that the texel of the four which is held by itself rather than the texel of the received coordinates is requested, and calculates the coordinate of that texel. It is similar for the four texels of other LOD. However, this calculation process performed by the address selector may be performed by the operation by the address generator of the requesting side, which generates the coordinates of four texels for each one LOD and sends them to the texture memory cluster which is held.

In this way, to each address selector, the requests for eight texels including that from the directly connected address generator are input. Then, the address selector sequentially outputs the eight requests to the address distributor. The address distributor calculates the physical address of the memory corresponding to the coordinates of the texel, and outputs the physical address to the memory bank corresponding to the physical address. Then, the target texel value is output to the data collector, and sent to the requesting texture memory cluster via the data exchange bus. If the texel value is the request by the texture memory cluster of itself, it is directly sent to the filter. The filter performs a predetermined calculation using the seven texel values sent via the data exchange bus as described above and one texel value sent from the data collector of itself, thereby to generate a texture value. The generated texture value is output to the connected drawing processor. The drawing processor looks up the color information generated by the fragment generator and corresponding to the pixel on the screen to which the texture value corresponds, and the value in the frame buffer, generates display data for the pixel, and stores it in a predetermined frame buffer. The data input to the frame buffer is read out by the controller and displayed on the display device.

The operation of FIG. 2 has been described, and the memory bank is further described. As described above, the address distributor outputs its physical address to the memory bank corresponding to the physical address. That is, also in the memory bank within each texture memory cluster, storage is interleaved by physical address. Here, there are eight memory banks, interleaving may be made by the lower three digits of a physical address. This allows a texture image to be stored in the texture memory clusters without duplication of any texel value, which is effective in reducing the amount of textures. For instance, in the first prior art example, communication is made to perform a brightness calculation in each processor, and thus duplication always occurred in the texels to be stored in the memory in each processor. Also in the second prior art example, a memory of 8 Mbytes is necessary for storing a texture image of 1 Mbyte. On the other hand, the present invention needs only 1 Mbyte to store a texture image of 1 Mbyte, and it can a large amount of texture images which are becoming larger and larger, and thus effective.

Figure 4:
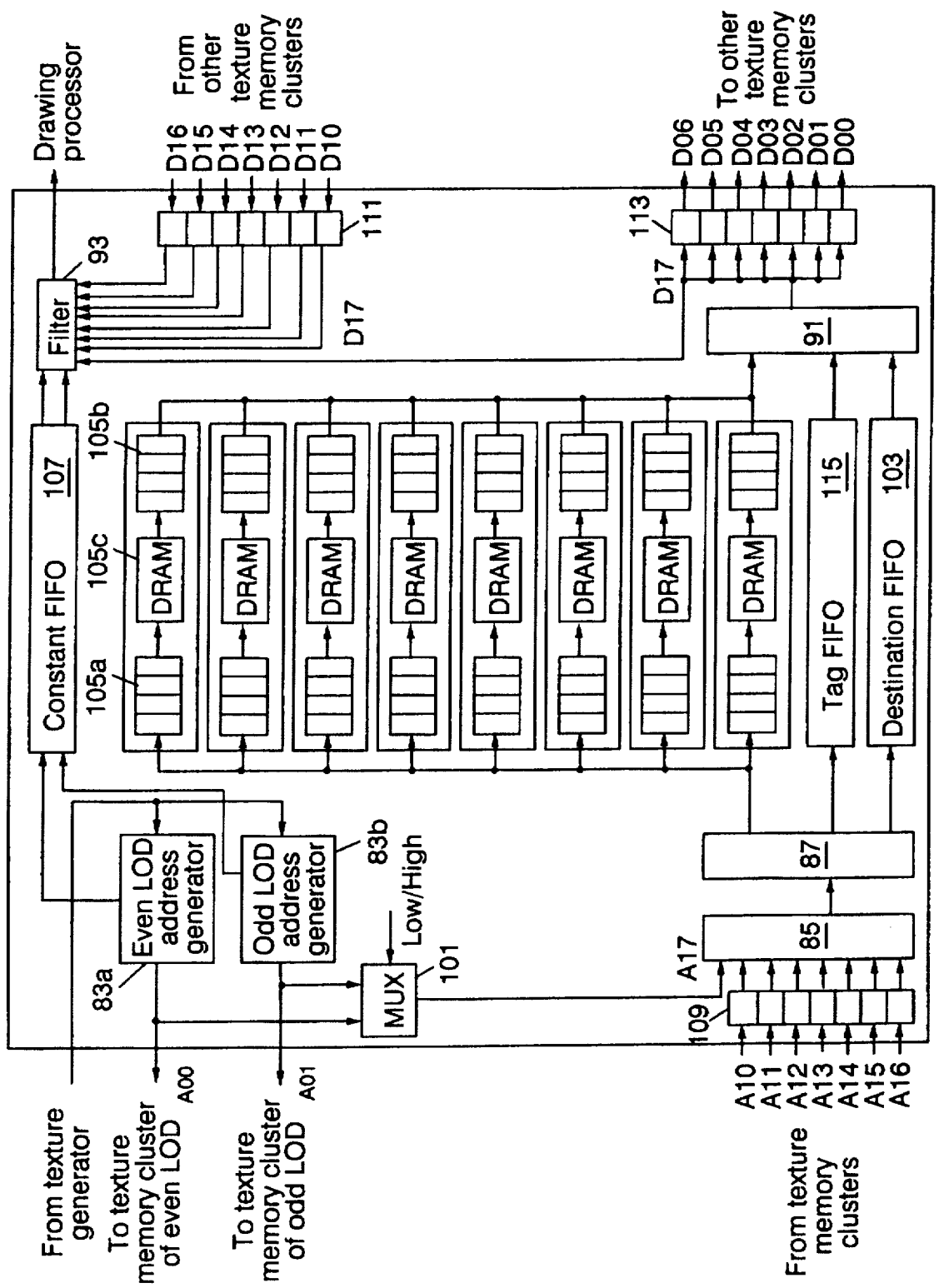
FIG. 4 is a detailed block diagram of the inside of the texture memory cluster.
Figure 6A:
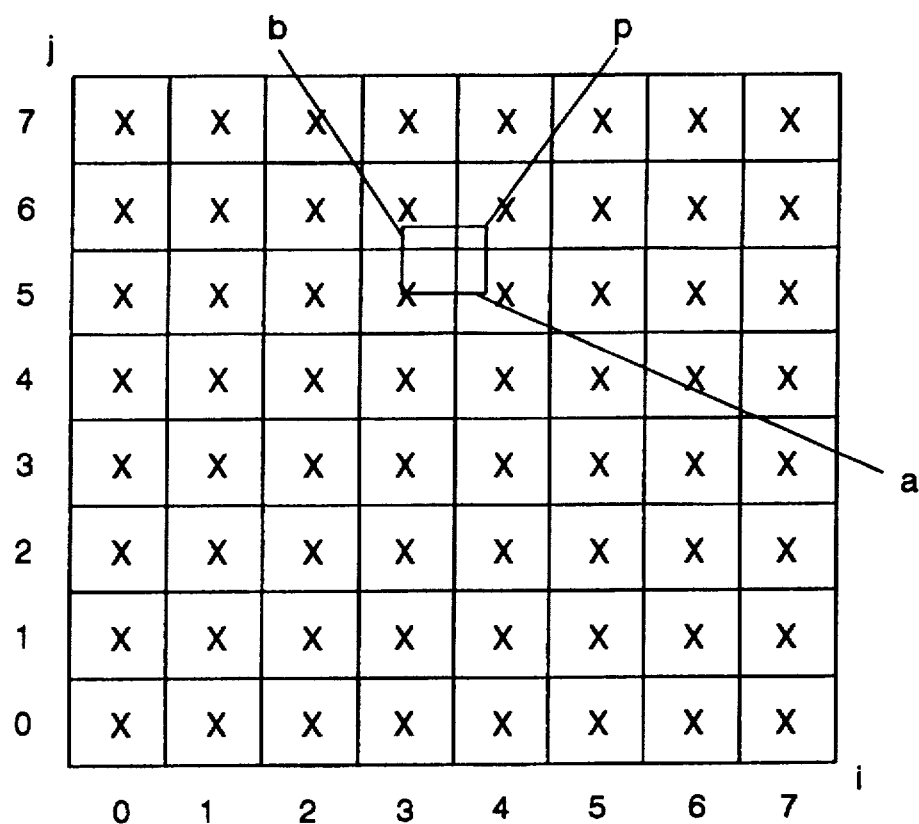
FIG. 6 is an explanatory view for explaining mipmap, in which (A) is a diagram showing a texture image which is a mipmap of level 0, and (B) is a diagram showing a texture which is a level 1 mipmap of a half size.
Figure 6B:
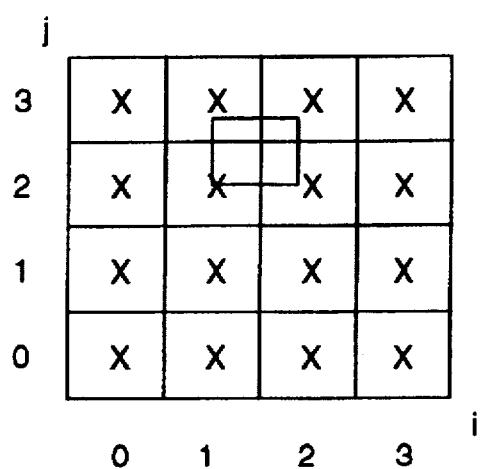
Figure 7:
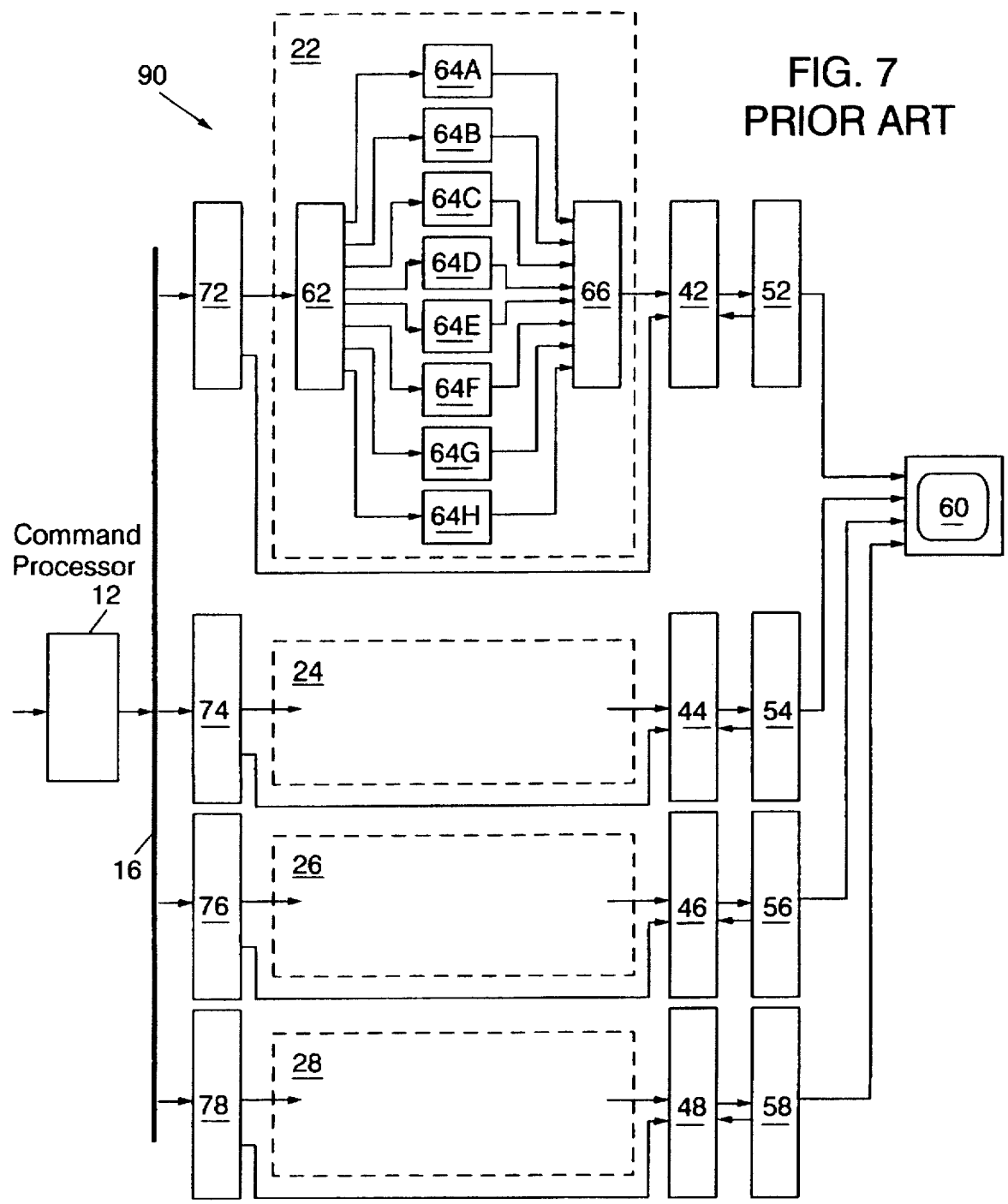
FIG. 7 is a block diagram showing the construction of the main portions of the conventional computer graphics system.

The details of the texture memory cluster shown in FIG. 2 are shown in FIG. 4. The output of the texture generator is connected to an even LOD address generator 83a and an odd LOD address generator 83b. Also, the outputs of the two address generators are connected to the address distribution bus 31. Further, depending on the texels stored in the particular texture memory cluster, the output of either of the two address generators is connected to the address selector 85. To the address selector 85, the outputs from the other texture memory clusters are input through a buffer 109. In addition, the address selector 85 is connected to the address distributor 87, which is connected to a plurality of memory banks 105 (here, eight). In each memory bank, there are an input FIFO buffer 105a, a DRAM 105c, and an output FIFO buffer 105b. Also, the address selector 87 is connected to a tag FIFO buffer 115 and a destination FIFO buffer 103. The outputs of the memory banks, tag FIFO buffer 115, and destination FIFO buffer 103 are connected to the data collector 91. One output of the data collector 91 is provided to the other texture memory clusters through a buffer 113, and other output is provided to the filter 93. To the filter 93, the outputs from the other texture memory clusters are input through a buffer 111. The output of the filter 93 is connected to the drawing processor, as described above.

The operation of FIG. 4 is described below. The address generator of FIG. 2 consists of the even LOD address generator 83a and the odd LOD address generator 83b. The even LOD address generator is connected to the texture memory clusters for storing texture images related to even LOD. Similarly, the odd address generator is connected to the texture memory clusters for storing texture images related to odd LOD. Naturally, the texture memory cluster of itself stores texels, and thus a multiplexer 101 is operated by the LOD of the texture image stored by itself to provide an output to the address selector 85. Then, constants necessary for calculating the texture value is stored in a constant FIFO 107. The necessary constants are those called a, b, and d in the description of the prior art.

Also in the other texture memory clusters, for instance, the coordinates of the texel of the lower-left to the necessary texel are output, and thus the output is input to the buffer 109. The address selector selects one by one from the outputs of the buffer 109 and the multiplexer 101, and recognizes the texel of the necessary four texels which is corresponding to the coordinates of the lower-left texel and stored by itself, as described above. Then, it calculates the coordinates of that texel. However, if a construction is provided in which the physical address stored in the necessary texel is output when the coordinates of the lower-left texel is obtained, it is more efficient. Although, in the description of FIG. 2, the former operation was taken in view of the context, the latter can be taken with no difficulty because the correspondence relationship is clear. As to the physical address generated in the address selector 85, the address distributor recognizes the memory bank to which the distribution is made by the lower three digits of the address, and inputs the ID (or tag) of the memory bank to the tag FIFO 115. Further, the ID of the texture memory cluster which requested the texel value stored at the physical address is input to the destination FIFO 103. By this, from which memory bank the output is read and to which texture memory cluster it is sent can be recognized in a correct sequence. The physical address is input to the input FIFO buffer 105a of the corresponding memory bank. Since interleaving by address is adopted, input physical addresses may concentrate on one memory bank. This FIFO is provided to obtain the output in a correct manner and without overflow even in such case. The output FIFO buffer 105b is provided for a similar reason. However, overflow may occur even if the input FIFO is provided, and thus the address distributor checks if there is an overflow. If there is, the input to the input FIFO buffer 105a is stopped until the processing of that memory bank proceeds and a space occurs in the input FIFO buffer 105a. The texel value is input to the output FIFO buffer 105b. At this point, the data collector 91 reads out the tag FIFO 115 and the destination FIFO 103 one by one. Then, it reads out the texel value from the output FIFO 105b in the memory bank indicated by the tag FIFO 115, and outputs it to the corresponding buffer 113, or to the filter 93 if based on the request of itself. Then, it is output from the buffer 113 to the requesting texture memory cluster.

The texel value obtained through the data exchange bus in this way is first stored in the buffer 111, and then input to the filter 93. Since the necessary eight texel values have been collected, a necessary constant is read out from the constant FIFO 107, and the filter 93 performs the calculation shown in the description of the prior art. A texture value is generated by this calculation and provided to the drawing processor.

As described above, by effectively utilizing the memories by this and performing the processing of the raster calculation means and the succeeding processings in parallel, the performance degradation could be held within a tolerance even if the communication between texture memory clusters were performed. However, this is merely an example, and for instance, the number of texture memory clusters can be made coincident with the number of the texels which need to be simultaneously accessed, or the texture memory access is performed a plurality of times to allow the number of texture memory clusters to be reduced, provided the performance can be degraded. Further, although the case has been shown in which the address generator is connected to the texture generator, the minification ratio LOD and the coordinates of the texture image may directly broadcast to a plurality of texture memory clusters and the calculation may be performed by the address selector. Furthermore, the number of memory banks may also be changed to a number which prevents the concentration of accesses. In addition, the number of the stages of the input FIFO buffer and the output FIFO buffer may also similarly be changed, because it depends on the capacity of the memory bank or the like.

Further, the number of the stages of the destination FIFO and the tag FIFO may also be changed, because it depends on the memory access speed or the like. In addition, although the case has been shown in which eight texels are needed at the same time, increase or decrease of such number may be served by the way of interleaving and the number of texture memory clusters.

Some of the advantages of the invention will now be described. As described above, a computer graphics system could be obtained which can achieve an efficient operation of the texture mapping function in the computer graphics interface.

In addition, a system also could be obtained in which the efficiency degradation can remain in a tolerance even if the capacity of the necessary memory is drastically reduced.

Specifically, the number of memory banks is eight, and the physical address is random. The access time of the DRAM is 60 ns. Each FIFO can operate at 7.5 ns, the physical address is input every 7.5 ns, and the address distributor can perform the distribution every 7.5 ns. As a result of a simulation which was performed on condition that the data collector can collect data from the output FIFO at 7.5 ns, the utilization rate of the DRAM became 85%, and the access rate was about 113 MHz.

We claim as our invention:

1. A computer system for performing a texture mapping comprising:

a plurality of texture memory clusters for storing interleaved texture image data composed of a plurality of texels in memories of each of said plurality of texture memory clusters so as to avoid duplication, each of said plurality of texture memory clusters having collecting means for computing, from the coordinates of a texture image for one pixel, texels necessary for calculating a texture value corresponding to the coordinates, means for collecting texel values having color information of the texels from said plurality of texture memory clusters, and means for calculating the texture value for said one pixel from said collected texel values;

a bus for interconnecting said plurality of texture memory clusters;

a plurality of texture generating means, each connected to one of said plurality of texture memory clusters, for calculating the coordinates of the texture image for said one pixel; and a plurality of drawing processors, each connected to one of said plurality of texture memory clusters, for generating data to be displayed on said one pixel by using the texture value for said one pixel.

2. A computer system for performing a texture mapping as set forth in claim 1, wherein said collecting means comprises:

means for computing, from the coordinates of a texture image for one pixel, texels necessary for calculating a texture value corresponding to the coordinates, and communicating communicated texels to said plurality of texture memory clusters;

retrieval means for retrieving information from said memory to obtain the texel values of said communicated texels;

means for sending said texel values to the texture memory clusters; and means for receiving said texel values.

3. A computer system for performing a texture mapping as set forth in claim 1 wherein said memory is divided into a plurality of banks, and each bank interleaves and stores the texture image data stored in said texture memory clusters so as to avoid duplication.

4. A computer system for performing a texture mapping as set forth in claim 3 wherein said plurality of banks includes an input FIFO buffer and an output FIFO buffer.

5. A computer system for performing a texture mapping as set forth in claim 2 wherein said retrieval means comprises:

means for calculating an address of said communicated texel;

distribution means for distributing, from said calculated address, said address to a corresponding bank of said memory; and means for obtaining texel values from the bank of said memory.

6. A computer system for performing a texture mapping as set forth in claim 5 wherein each of said texture memory clusters further comprises a FIFO buffer for storing the ID's of the texture memory clusters receiving said necessary texels.

7. A computer system for performing a texture mapping as set forth in claim 5 wherein each of said texture memory clusters further comprises a FIFO buffer for storing the ID of the bank of said memory to which said calculated address was distributed.

8. A computer system for performing a texture mapping as set forth in claim 1 wherein said collecting means comprises:

means for notifying the coordinates of the texture image for said one pixel to said plurality of texture memory clusters;

means for calculating from said coordinates texels necessary for calculating a texel value corresponding to the coordinates, said texels being held by said memory;

means for fetching the texel values of said texels from said memory;

means for sending said texel values to the texture memory clusters; and means for receiving said texel values.

9. A computer system for performing a texture mapping comprising:

a plurality of texture memory clusters for storing interleaved texture image data in each memory so as to avoid duplication, said texture image data containing a texture image composed of a plurality of texels, and a reduced texture image including data obtained by reducing the texture image in one or more grades and which is comprised of one or more texels, each of said plurality of texture memory clusters having means for computing, from the coordinates of said texture image for one pixel and the reduction ratio between the pixel and the texel of said texture image, texels necessary for calculating a texture value for said one pixel, and for requesting that said plurality of texture memory clusters output texel values which include color information of said texels, means for retrieving and outputting said requested texel values to said requested texture memory clusters, means for collecting the values of said texels, and means for calculating said texture value from said collected texel values;

a bus for interconnecting said plurality of texture memory clusters;

a plurality of texture generating means each connected to one of said plurality of texture memory clusters, for calculating the coordinates of the texture image for said one pixel and said reduction ratio; and a plurality of drawing processors each connected to one of said plurality of texture memory clusters, for generating data to be displayed on said one pixel by using the texture value for said one pixel.

* * * * *